United States Patent [19]

Aoki

[11] Patent Number: 5,460,249
[45] Date of Patent: Oct. 24, 1995

[54] VENTILATED-TYPE DISC ROTOR

[75] Inventor: Tetsuro Aoki, Ashikaga, Japan

[73] Assignee: Kiriu Machine Mfg. Co., Ltd., Kiryu

[21] Appl. No.: 281,533

[22] Filed: Jul. 28, 1994

Related U.S. Application Data

[63] Continuation of Ser. No. 116,266, Sep. 3, 1993, abandoned, which is a continuation of Ser. No. 879,265, May 7, 1992, abandoned.

[30] Foreign Application Priority Data

May 10, 1991 [JP] Japan ................ 3-042373 U
Dec. 13, 1991 [JP] Japan ................ 3-109954 U

[51] Int. Cl.$^6$ .................................................. F16D 65/00
[52] U.S. Cl. ................ 188/218 XL; 188/264 A
[58] Field of Search ............ 188/264 A, 264 AA, 188/218 XL, 71.6; 192/70.12, 107 R, 113 A

[56] References Cited

U.S. PATENT DOCUMENTS

| | | | |
|---|---|---|---|
| 2,368,621 | 2/1945 | Tack | 188/264 A |
| 2,423,056 | 6/1947 | Tarbox | 188/264 A X |
| 2,627,325 | 2/1953 | Halsten | 188/218 XL |
| 4,177,883 | 12/1979 | Margetts. | |
| 4,638,891 | 1/1987 | Wirth | 188/264 A X |
| 5,161,652 | 11/1992 | Suzuki | 188/218 XL |

FOREIGN PATENT DOCUMENTS

| | | | |
|---|---|---|---|
| 2906589 | 8/1980 | Germany | 188/218 XL |
| 2942151 | 4/1981 | Germany. | |
| 3811222 | 10/1989 | Germany. | |
| 4013244 | 10/1991 | Germany. | |
| 57-145845 | 9/1982 | Japan. | |
| 49545 | 3/1983 | Japan | 188/218 XL |
| 58-134241 | 8/1983 | Japan. | |
| 107834 | 4/1990 | Japan | 188/218 XL |
| 2-253020 | 11/1990 | Japan. | |

Primary Examiner—Mark T. Le
Attorney, Agent, or Firm—Oliff & Berridge

[57] ABSTRACT

A ventilated-type disc rotor free from thermal deformation at the time of braking operation, generation of cracks and the phenomenon of brake jadder is provided. An inner end of a rib continuously connecting an external disc and an internal disc extends radially and inwardly beyond the inner peripheral surfaces of the discs and continuously connected to a cylindrical member which is by turn connected to a flange to be fitted to a body of a vehicle, and a gap is formed between the inner peripheral surface of the external disc and an outer peripheral surface of the cylindrical member.

5 Claims, 20 Drawing Sheets

VENTILATED-TYPE DISC ROTOR

This is a Continuation of application Ser. No. 08/116,266 filed Sep. 3, 1993, now abandoned, which in turn is a Continuation of application Ser. No. 07/879,265 filed May 7, 1992, now abandoned.

BACKGROUND OF THE INVENTION

This invention relates to an improvement on a ventilated-type disc rotor to be used for a braking system of a vehicle.

In a conventional ventilated-type disc rotor such as the one as disclosed in Japanese Patent Laid-open No. 2-253020 and illustrated in FIGS. 16 and 17 of the accompanying drawings, a disc rotor which is generally designated by reference numeral 1 in these figures comprises an internal disc 2 and an external disc 3 disposed in a face-to-face relationship with a number of ribs 4 radially arranged between the discs to provide pathways 5 for cooling air defined by any two adjacent ribs so that the two discs are frictionally pressed against each other by way of a brake pad for braking the vehicle and the heat generated on the frictional surfaces of the discs is moved away from there with the air to cool the heated discs.

The external disc 3 is connected at its inner periphery to a cylindrical member 6, which is by turn connected to the outer periphery of a fitting plate 7 that constitutes a flange to be secured to the vehicle main body. Said fitting plate 7 is provided with a central bore 8, fitting holes 9 and auxiliary holes 10 arranged for making the operation of removing said disc rotor from the vehicle main body be carried out without difficulty.

A known ventilated-type disc rotor as described above is accompanied by a drawback of presenting a phenomenon of thermal deformation of the internal and external discs 2 and 3, which is typically illustrated by broken lines in FIG. 18, due to the heat generated on these discs 2 and 3 particularly when the vehicle is braked while the wheel shafts are rotating at an enhanced rate or when the vehicle is braked frequently within a short period of time.

A large internal stress becomes present in the external disc 3 as such a phenomenon takes place, leading to generation of radial cracks as typically indicated by C1 and C2 in FIGS. 19 and 20. Besides, as the discs are thermally deformed, the abutment (contact) of the brake pad and the disc rotor 1 becomes unstable and a so-called brake jadder phenomenon that fluctuates the braking effect of the brake can occur.

SUMMARY OF THE INVENTION

It is therefore an object of the present invention to provide a ventilated-type disc rotor whose external and internal discs are free from thermal deformation when they are used for fierce braking operations and therefore free from cracks and which shows excellent cooling and braking efficiencies under any conditions where the vehicle that carries it is driven.

According to the present invention, the above object is achieved by providing a ventilated-type disc rotor comprising an external disc, an internal disc and radial ribs arranged between and connected to the discs, characterized in that an inner end of each of said ribs radially extends from the inner peripheral surfaces of said discs toward the center of the discs and is continuously connected to a cylindrical member continuously connected to an outer peripheral of a flange to be fitted to a body of a vehicle, and a gap is formed between an inner peripheral surface of the external disc and an outer peripheral surface of the cylindrical member.

With such an arrangement, since the frictional surfaces of the external and internal discs are connected only to the ribs and not to the cylindrical member which is fitted to the outer periphery of a flange to be fitted to the main body of a vehicle and a gap is provided between the inner peripheral of the external disc and the outer peripheral surface of the cylindrical member, the overall cooling effect of the disc rotor is significantly improved and the thermal deformation of the discs can be minimized because the external disc and the cylindrical member are connected to each other only by way of the radially arranged thick ribs which normally remain cooler than the frictionally heated discs so that the internal stress of the external disc can be reduced and any possibility of occurrence of cracks can be eliminated to improve the abutment of the brake pad and the disc rotor and consequently their durability.

According to another aspect of the present invention, desired numbers of bulged reinforcement sections are formed at and near the inner ends of the ribs. Said bulged reinforcement section may be a bridge continuously connecting the inner ends of adjacent ribs each other in a space between the ends. Alternatively, a bulge may be formed on an outer peripheral surface of said cylindrical member. Still alternatively, said bulged reinforcement section may be a broadened section at and near the inner end of the rib. Still alternatively, said bulged reinforcement section may comprise a broadened section at and near the inner end of the rib and a bridge connecting adjacent broadened sections of a desired number of ribs. Still alternatively, said bulged reinforcement section may be a bridge arranged in a gap between the inner peripheral surface of the external disc, and the outer peripheral surface of the cylindrical member. Still alternatively, a first rib and a second rib may be arranged alternately, an inner end of said first rib extends radially and inwardly from the inner peripheral surfaces of the external and internal discs, the second rib may be recessed radially and outwardly from the inner peripheral surfaces of the external and internal discs, said first rib may be provided with a broadened section at and near the inner end, and an air pathway may extend to the cylindrical member. Any of these alternative forms of reinforcement may be realized without increasing the number of steps required for producing a ventilated-type disc rotor by casting.

DESCRIPTION OF THE PREFERRED EMBODIMENTS

Figure 1:
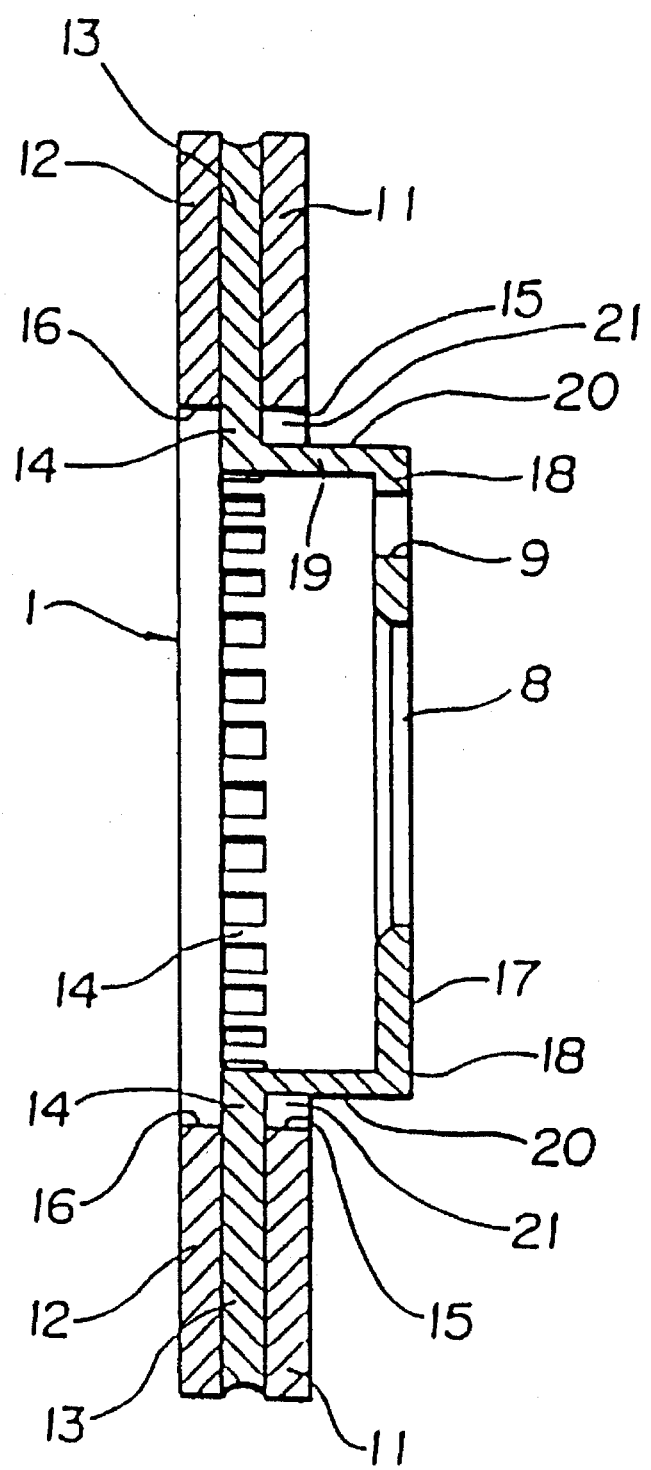
FIG. 1 is a longitudinal sectional view of a preferred embodiment of the invention cut along 1—1 line in FIG. 2.
Figure 2:
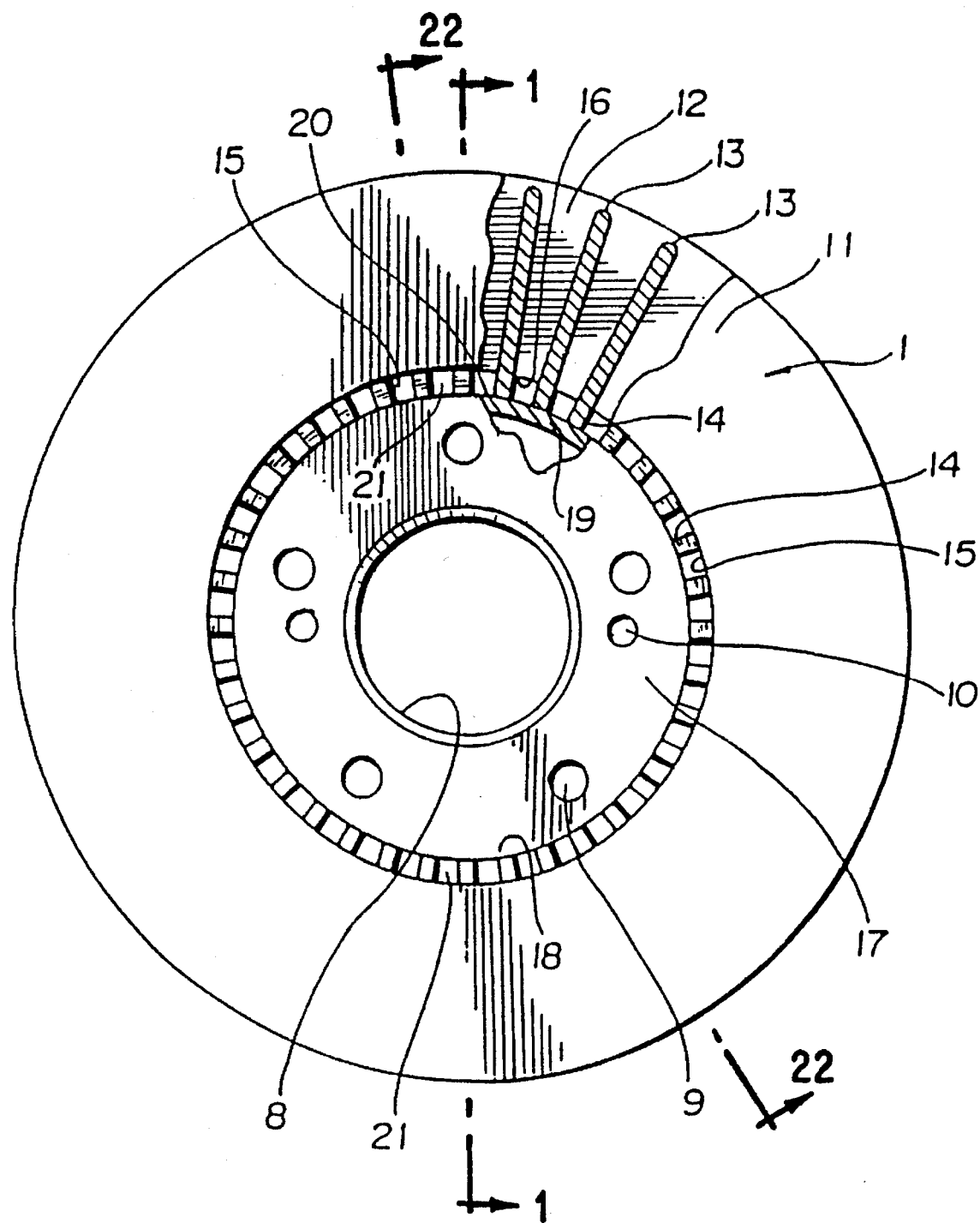
FIG. 2 is a partially cut out plan view of the embodiment of FIG. 1.

Referring firstly to FIGS. 1 and 2 showing a preferred embodiment of the invention, a ventilated-type disc rotor 1 according to the invention comprises an external disc 11 and an internal disc 12 juxtaposed in a face-to-face relationship and integrally formed with a number of ribs 13 arranged radially therebetween. For instance, the external disc 11, the internal disc 12 and the ribs 13 may be prepared into a single piece by casting.

An inner end 14 of the rib 13 radially extends from inner peripheral surfaces 15, 16 of the external and internal disc 11, 12 toward the center of the discs.

The inner end 14 of the rib 13 is integrally connected to a cylindrical member 19. The cylindrical member 19 is integrally connected to an outer peripheral 18 of a fitting plate 17 which is used for securely fitting the ventilated-type disc rotor 1 to a body of a vehicle. In this illustrated embodiment, the external disc 11, the internal disc 12, the ribs 13, the cylindrical member 19 and the fitting plate or flange are integrally formed by casting to form them as one piece. Alternatively, however, the fitting flange may be welded and the remaining components may be cast and connected to the welded flange so as to form them as one piece. Still alternatively, any known arts may be utilized to produce an assembly of the discs, the ribs, the cylindrical member and the fitting flange as one piece.

A gap 21 is formed between an inner peripheral surface 15 of the external disc 11 and an outer peripheral surface 20 of the cylindrical member 19.

The fitting plate 17 is provided with a central bore 8, fitting holes 9 and auxiliary holes 10 in a conventional manner.

FIGS. 3 through 6 illustrate the second and third embodiments of the invention. In the second embodiment, a bridge 22 of a bulged reinforcement section 13A is formed with every other space 14A between an inner end 14 of a rib 13 and an inner end 14 the adjacent rib 13. In other words, the bridge 22 is alternately formed in the space 14A.

Figure 3:
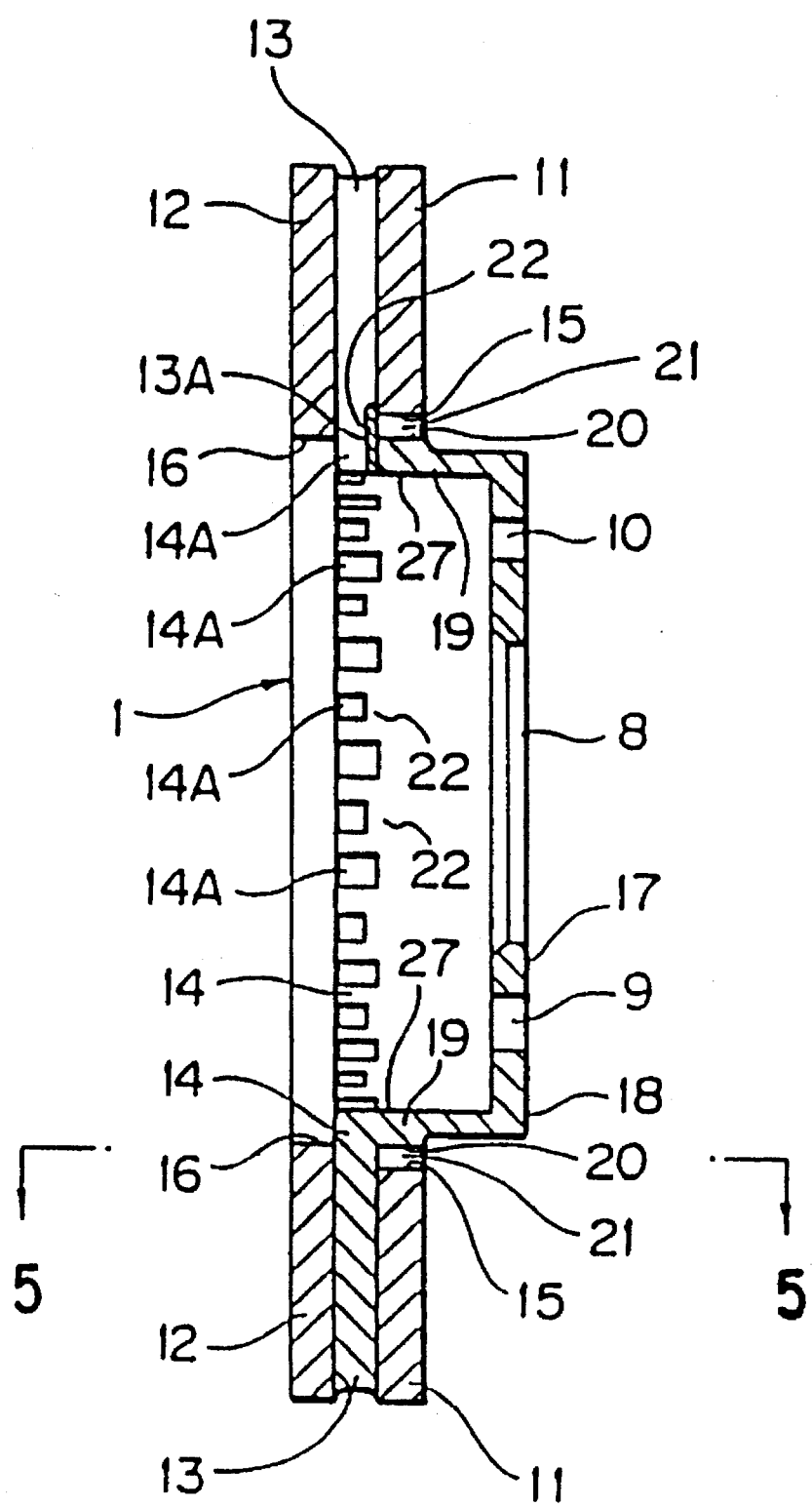
FIG. 3 is a longitudinal sectional view of another preferred embodiment of the invention cut along 3—3 line in FIG. 4.
Figure 4:
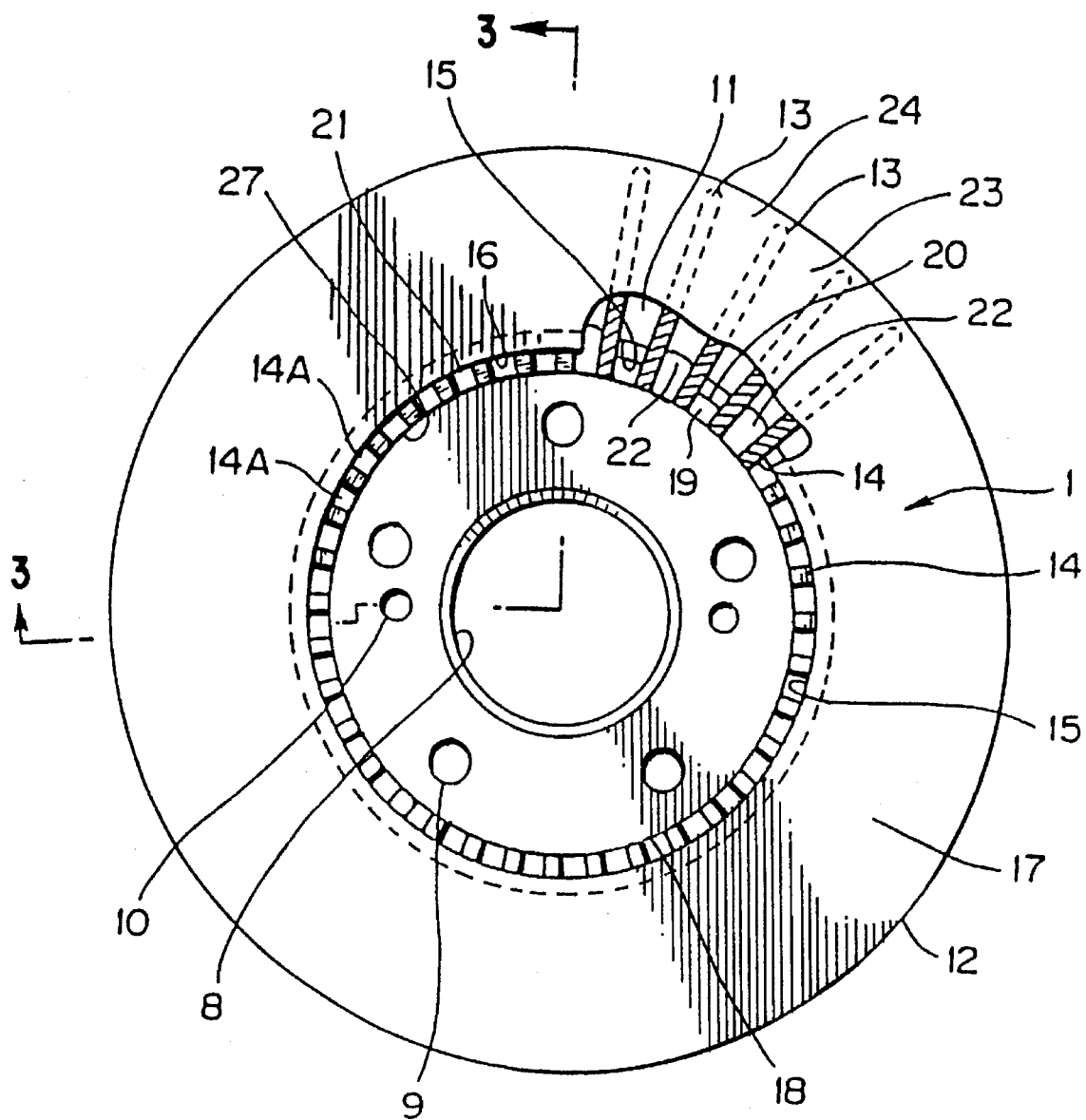
FIG. 4 is a front view of the embodiment of FIG. 3.
Figure 5:
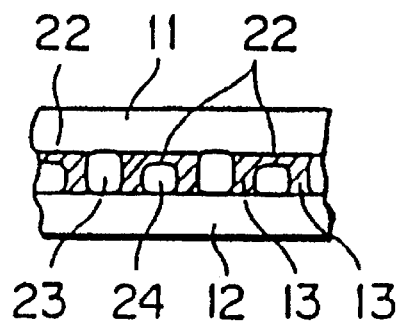
FIG. 5 is a partial sectional view of the embodiment of FIG. 3 cut along 5—5 line in FIG. 3.

Pathways 23, 24 for cooling air are formed at an lower end of the cylindrical body 19 between the external disc 11 and the internal disc 12. Since the inner end 14 of the ribs 13 is continuously connected to the cylindrical member 19 as illustrated in FIGS. 3 and 5, the pathway 24 is narrowed by the thickness of the respective bridges 22 with the end 14 of the rib 13. A portion connecting the inner end 14 of the rib 13 and the cylindrical member 19 is reinforced by the bridges 22 or the bulged reinforcement sections 13A.

Figure 6:
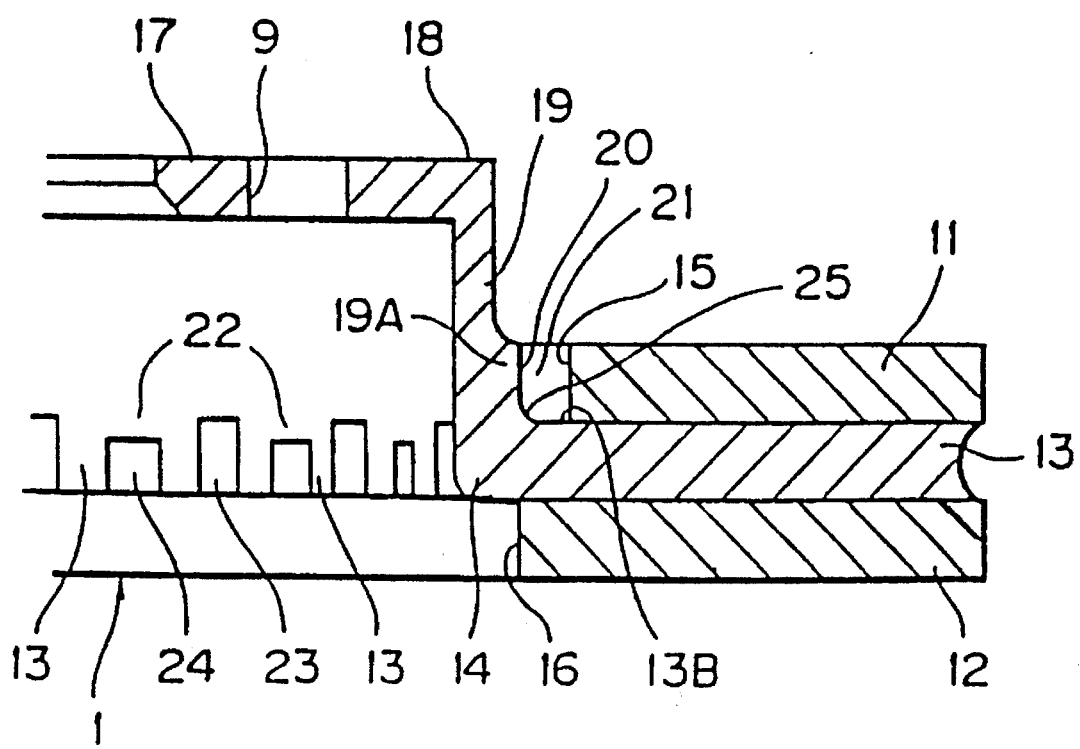
FIG. 6 is an enlarged partial view of the embodiment of FIG. 3.

FIG. 6 is an enlarged partial view of the portion continuously connecting the inner end 14 of the rib 13 and the cylindrical member 19. A bulge 19A is formed on an outer peripheral surface of the cylindrical member 19. An area 25 connecting the bulge 19A and an upper surface 13B of the rib 13 is rounded with a relatively large radius of curvature. The bulge 19A and the connecting area 25 strengthen the connection of the rib 13 and the cylindrical member 19.

Figure 7:
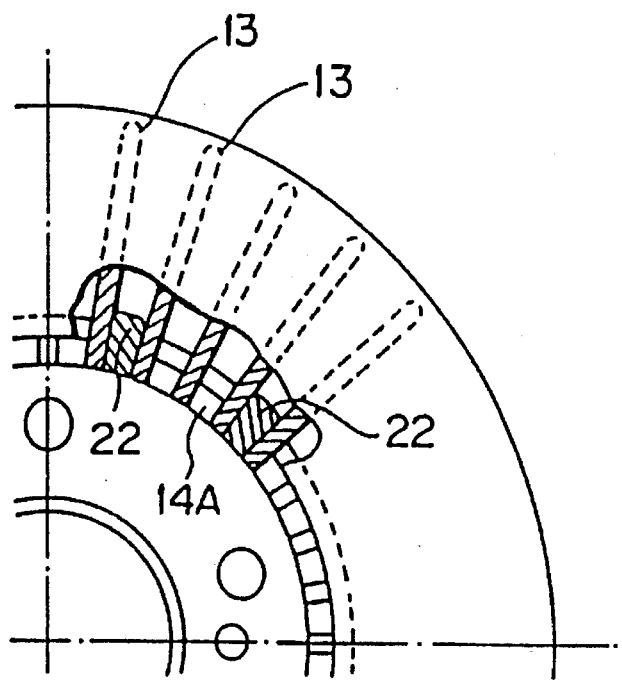
FIG. 7 is a partial front view of a still another embodiment of the invention.
Figure 8:
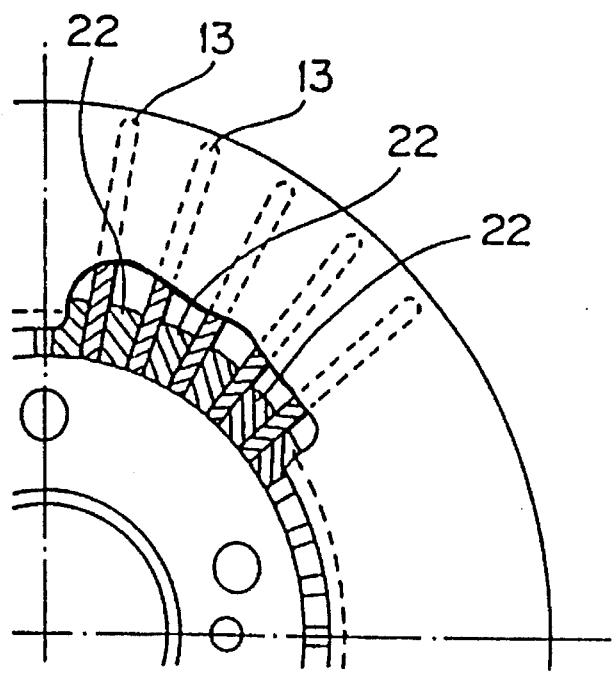
FIG. 8 is a partial front view of a still another embodiment of the invention.

In the embodiment illustrated in FIG. 3, the bridge 22 is formed in every other space 14A. The bridge 22 may be arranged in every third space 14A as illustrated in FIG. 7 or in every space 14A as illustrated in FIG. 8. The formation of the bridges 22 may be appropriately determined depending on the application of the ventilated-type disc rotor.

Figure 9:
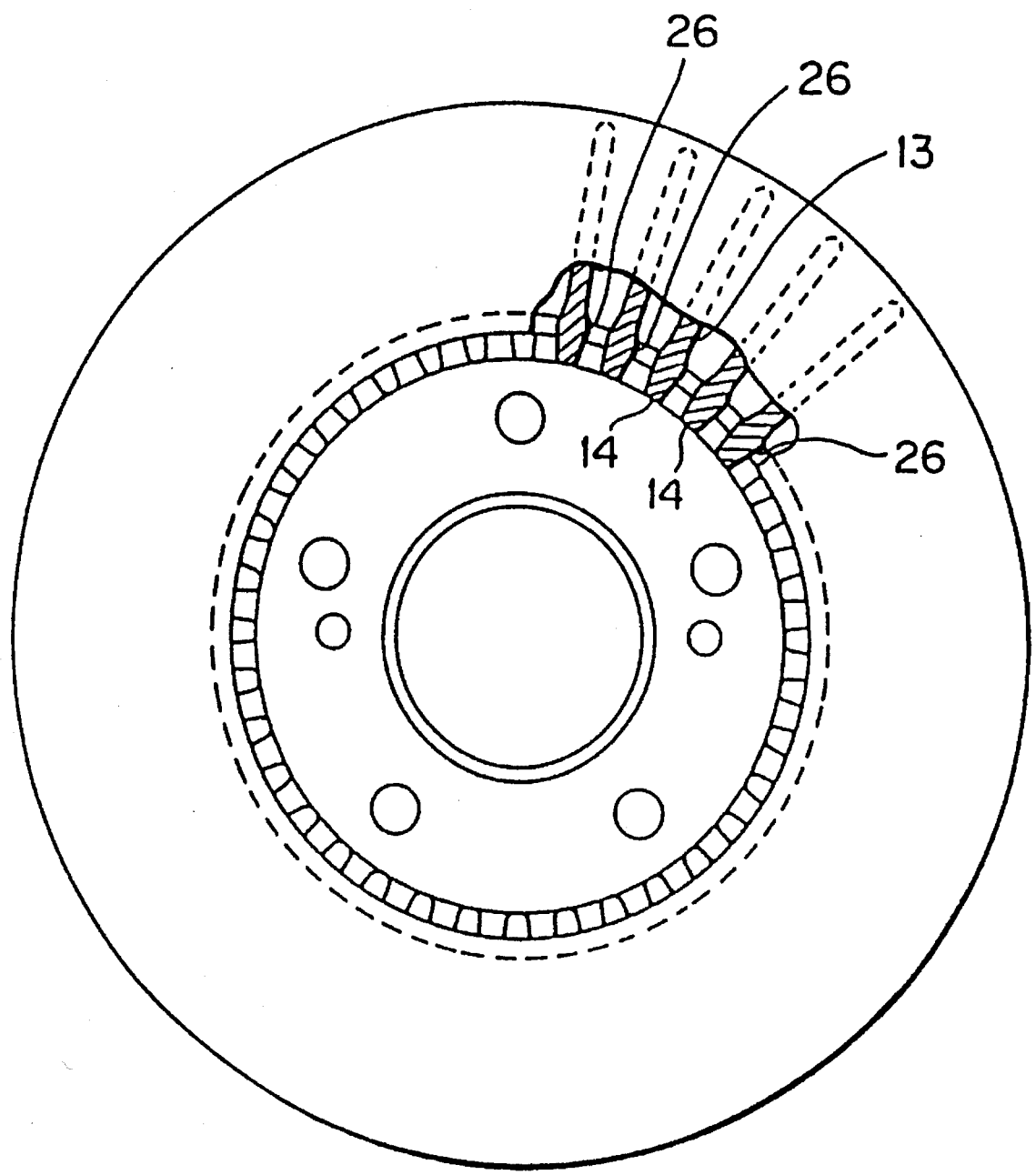
FIG. 9 is a partially cut out front view of a still another embodiment of the invention.

FIG. 9 illustrates another embodiment of the invention, where the reinforcement sections 13A provided at and near the inner ends 14 of the ribs 13 are realized in the form of broadened sections 26 which are formed over the entire axial thickness of the ribs 13 at and near their inner ends 14.

Figure 10:
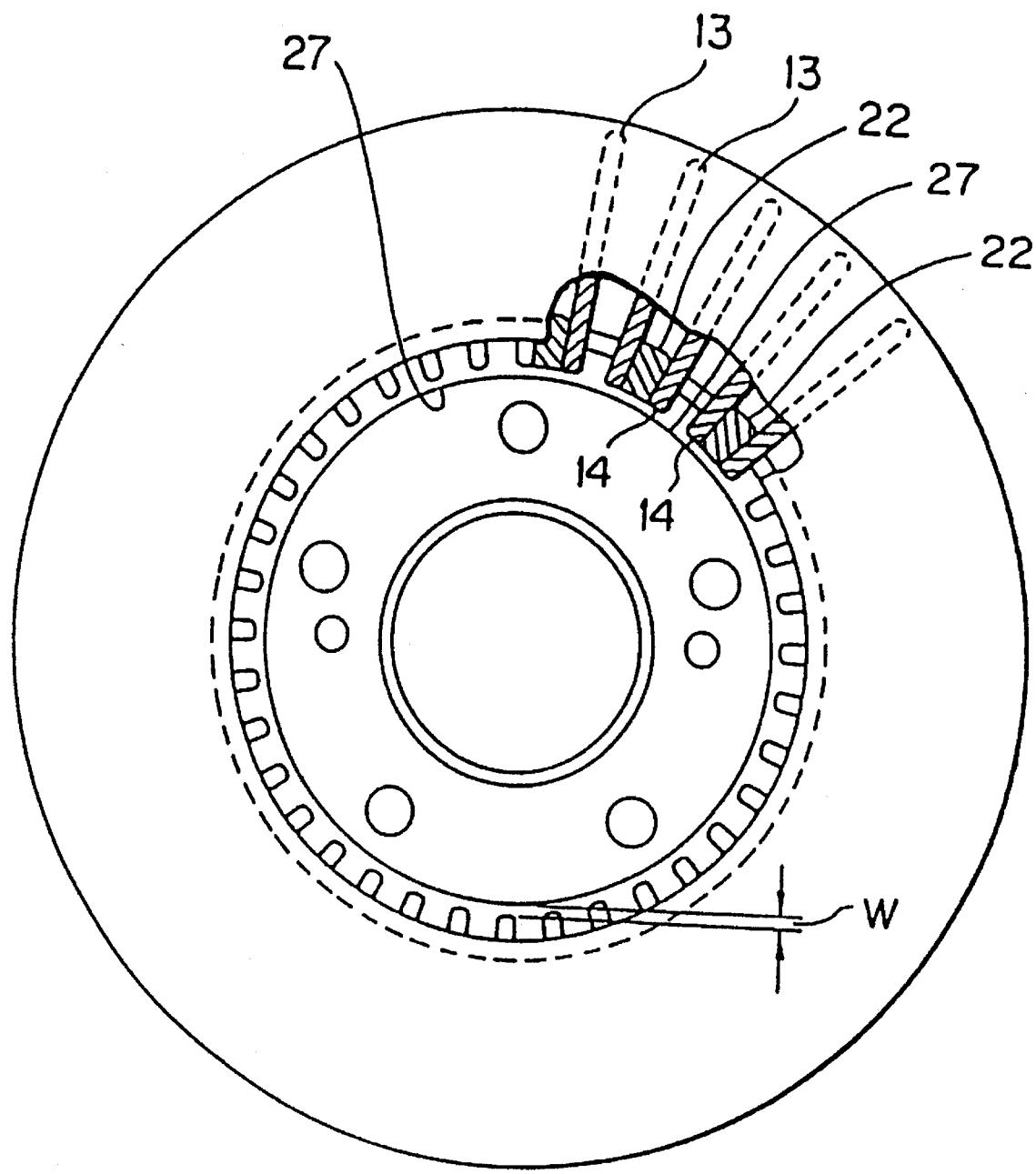
FIG. 10 is a partially cut out front view of a still another embodiment of the invention.

In the embodiments illustrated in FIGS. 3 through 9, the inner end 14 of the rib 13 has a surface same as an inner surface 27 of the cylindrical member 19. The inner end 14 may alternatively be radially and outwardly recessed from the inner surface 27 of the cylindrical member 19 by a distance W as illustrated in FIG. 10. Since the inner end 14 of the rib is 13 recessed from the inner surface 27 of the cylindrical member 19 by a distance W, when the inner surface 27 is finished by cutting, it can be avoided to interrupt the cutting operation caused by the construction that the inner end 14 of the rib 13 is positioned in the same surface as the inner surface 27.

Figure 11:
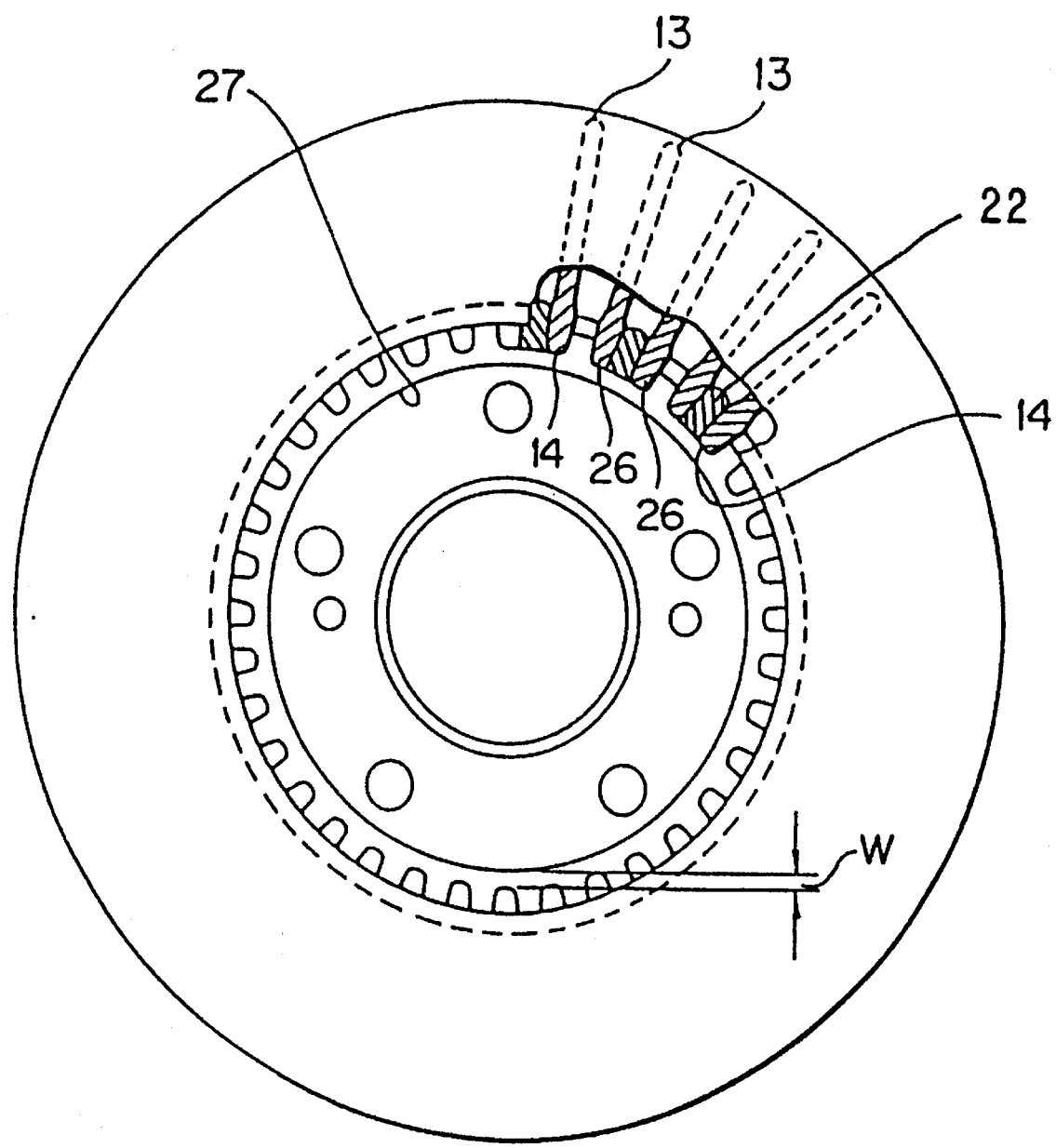
FIG. 11 is a partially cut out front view of a still another embodiment of the invention.

FIG. 11 shows still another embodiment of the invention. In this embodiment, the broadened section 26 is provided at each inner end 14 of the rib 13. The bridge 22 is arranged in every other space 14A to continuously connect the inner end 14 of the ribs 13 to the adjacent end. In addition, the inner end 14 is radially and outwardly recessed from the inner peripheral surface 27 of the cylindrical member 19 by a distance W. It will be easily understood that the bridges 22 may alternatively be realized in the form of those as illustrated in FIG. 5 or 6.

Figure 12:
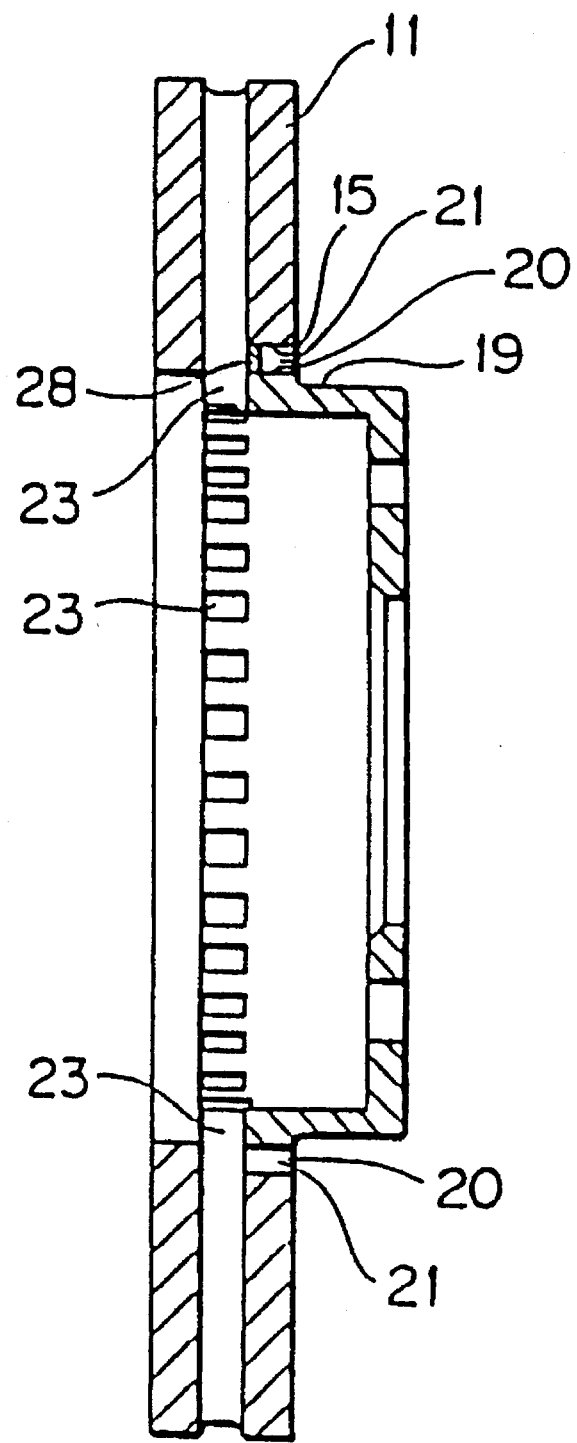
FIG. 12 is a longitudinal sectional view of a still another embodiment of the invention.

In the embodiment illustrated in FIG. 12, a bridge 28 is formed in a gap 21 between the inner surface 15 of the external disc 11 and the outer surface 20 of the cylindrical member 19 so as to prevent the pathway 25 for cooling air from narrowing.

Figure 13:
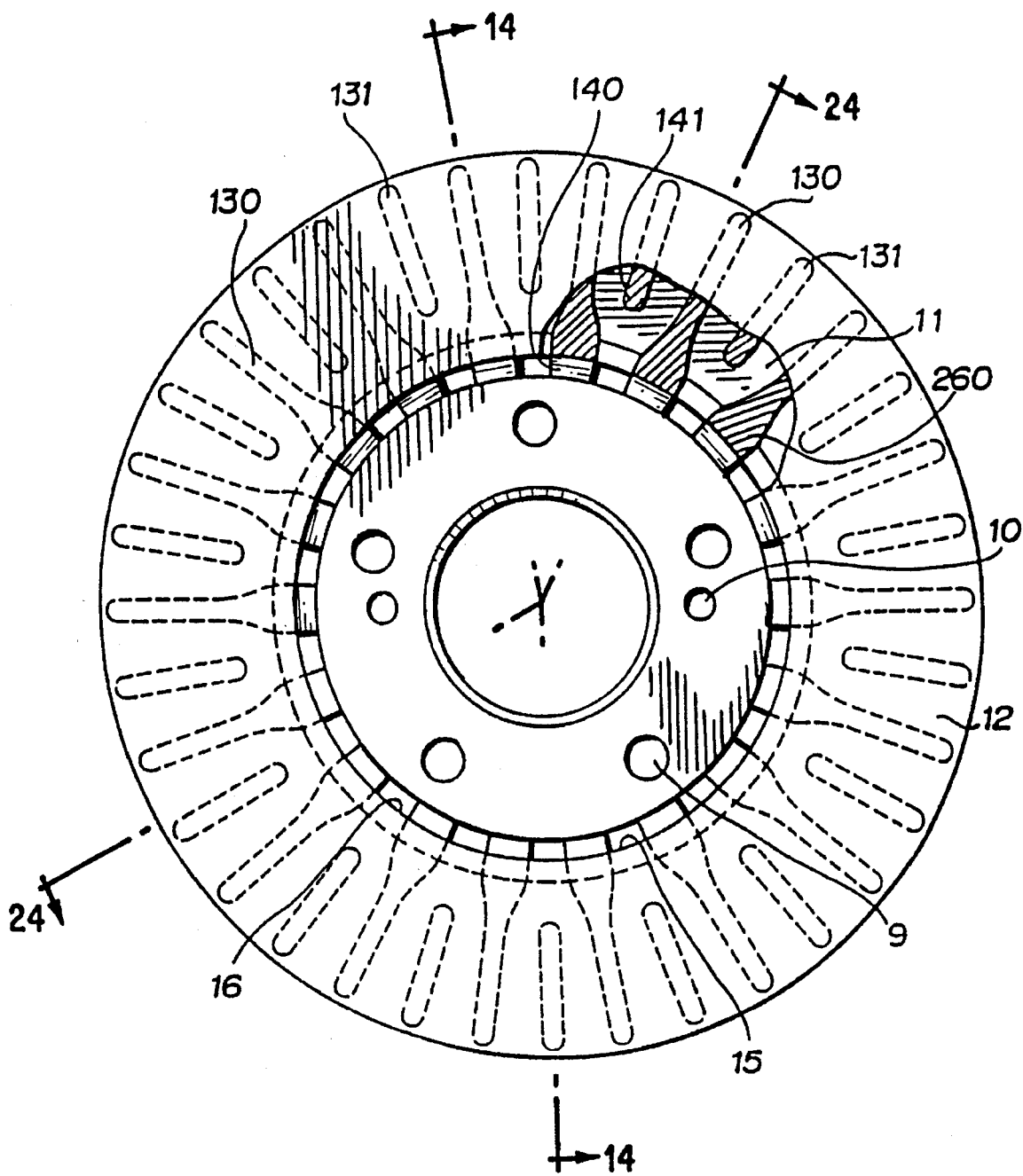
FIG. 13 is a partially cut out plan view of a still another embodiment of the invention.
Figure 14:
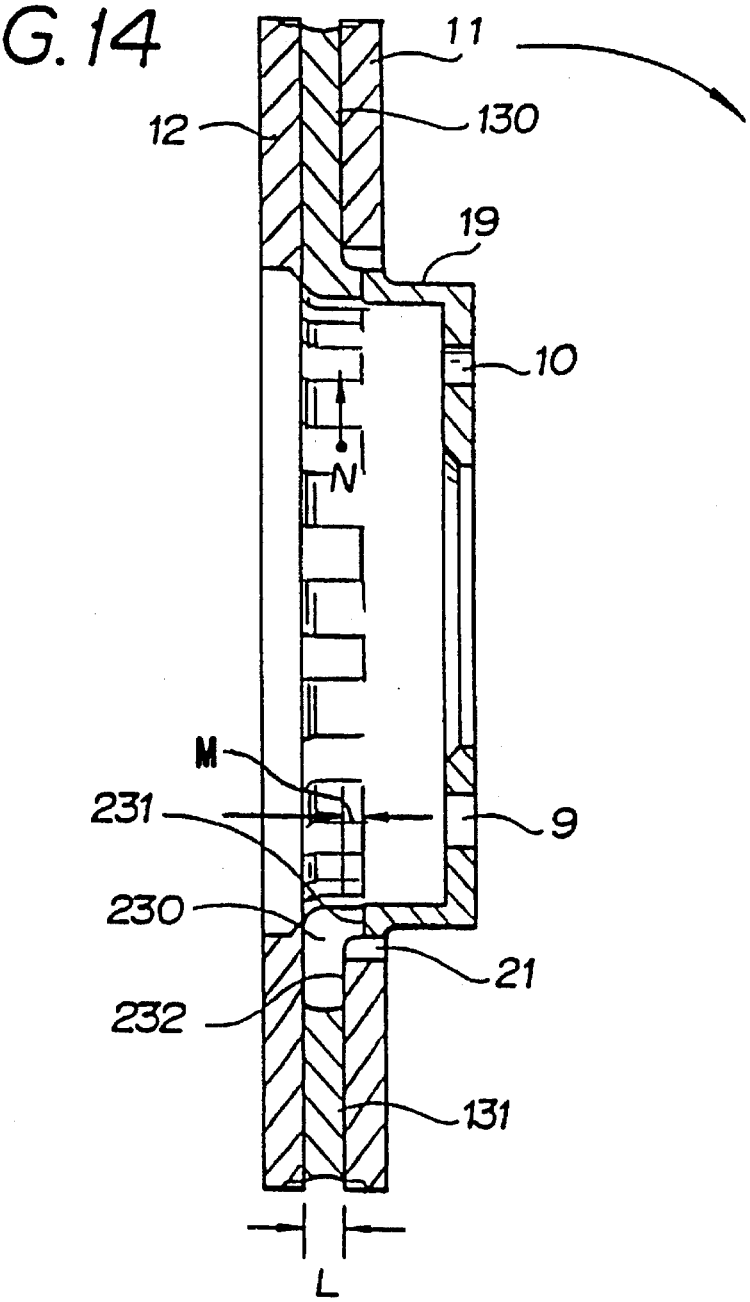
FIG. 14 is a longitudinal sectional view of the embodiment of FIG. 13 cut along 14—14 line in FIG. 13.
Figure 15:
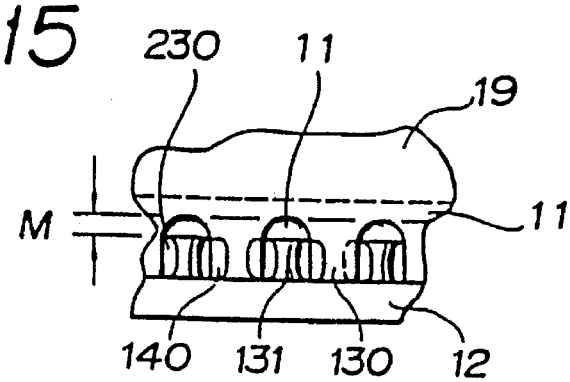
FIG. 15 is a partial view of the embodiment of FIG. 13 as viewed in the direction of N indicated in FIG. 14.
Figure 16:
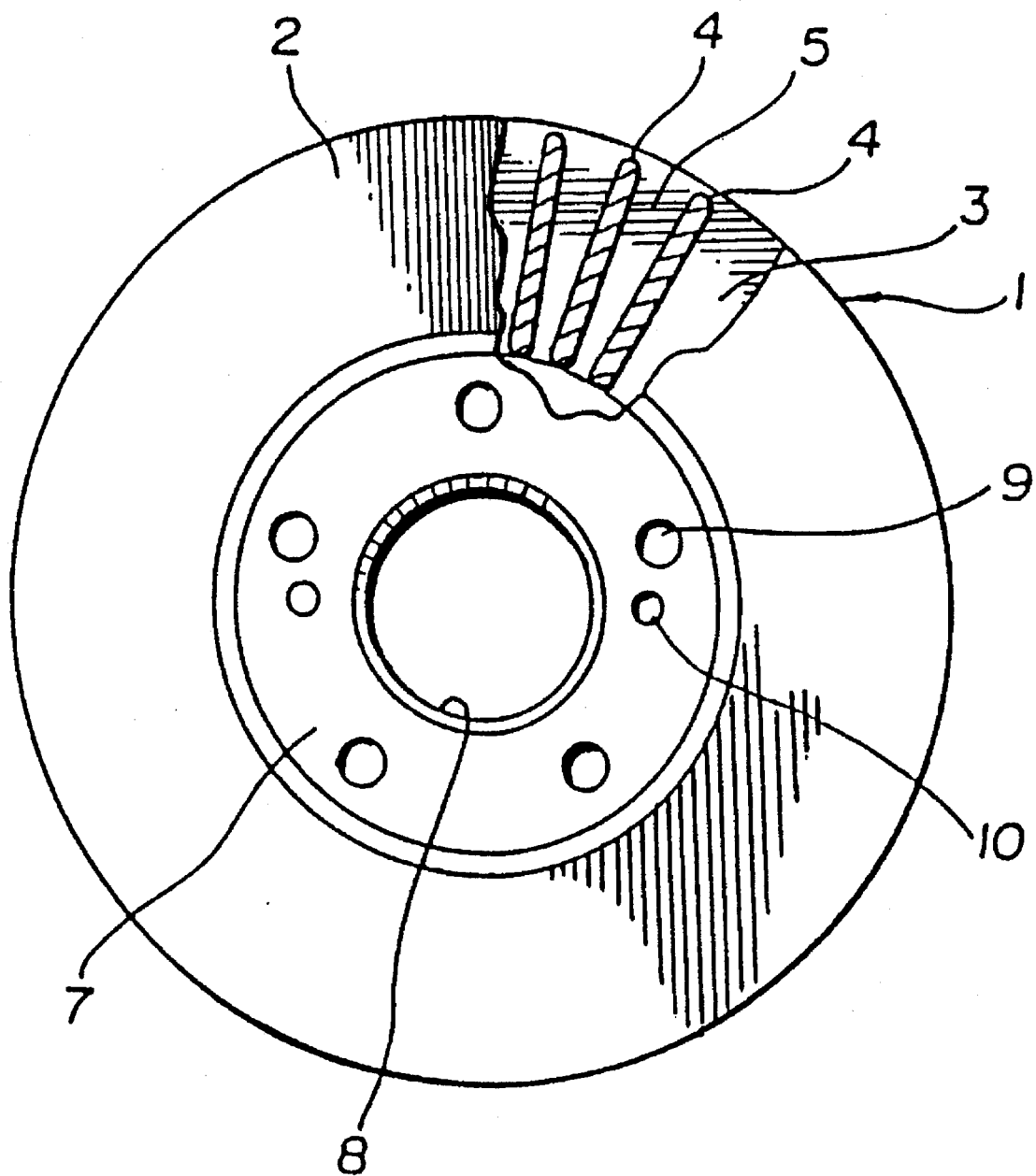
FIG. 16 is a partially cut out plan view of a conventional prior disc rotor.
Figure 17:
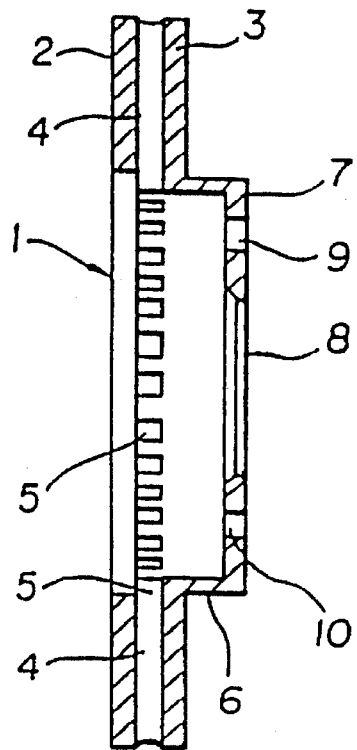
FIG. 17 is a longitudinal sectional view of the disc rotor in FIG. 16.
Figure 18:
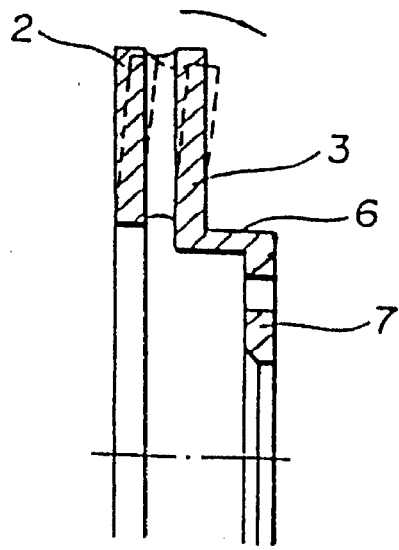
FIG. 18 is a longitudinal sectional view of the disc rotor of FIG. 16, schematically showing how its discs are thermally deformed.
Figure 19:
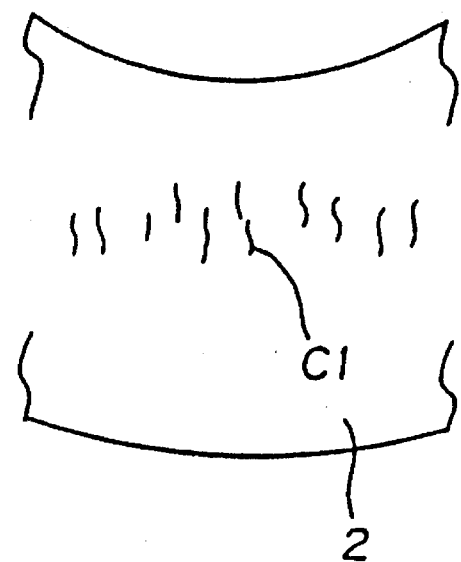
FIG. 19 is a partial plan view of the internal disc of the disc rotor of FIG. 16, schematically showing how cracks are formed there and become apparent.
Figure 20:
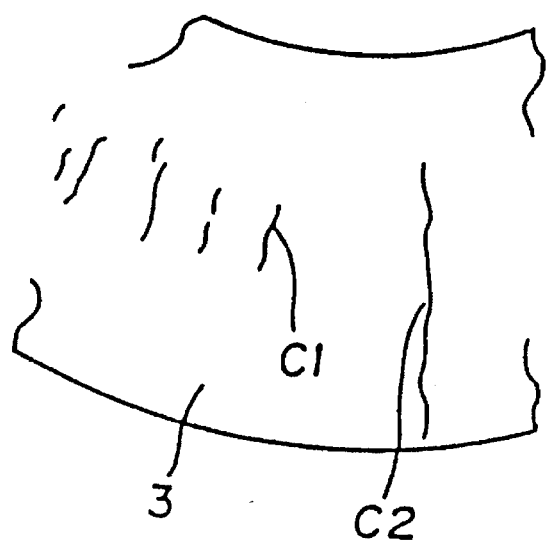
FIG. 20 is a partial plan view of the external disc of the disc rotor of FIG. 16, schematically showing how cracks are formed there and become apparent.
Figure 21:
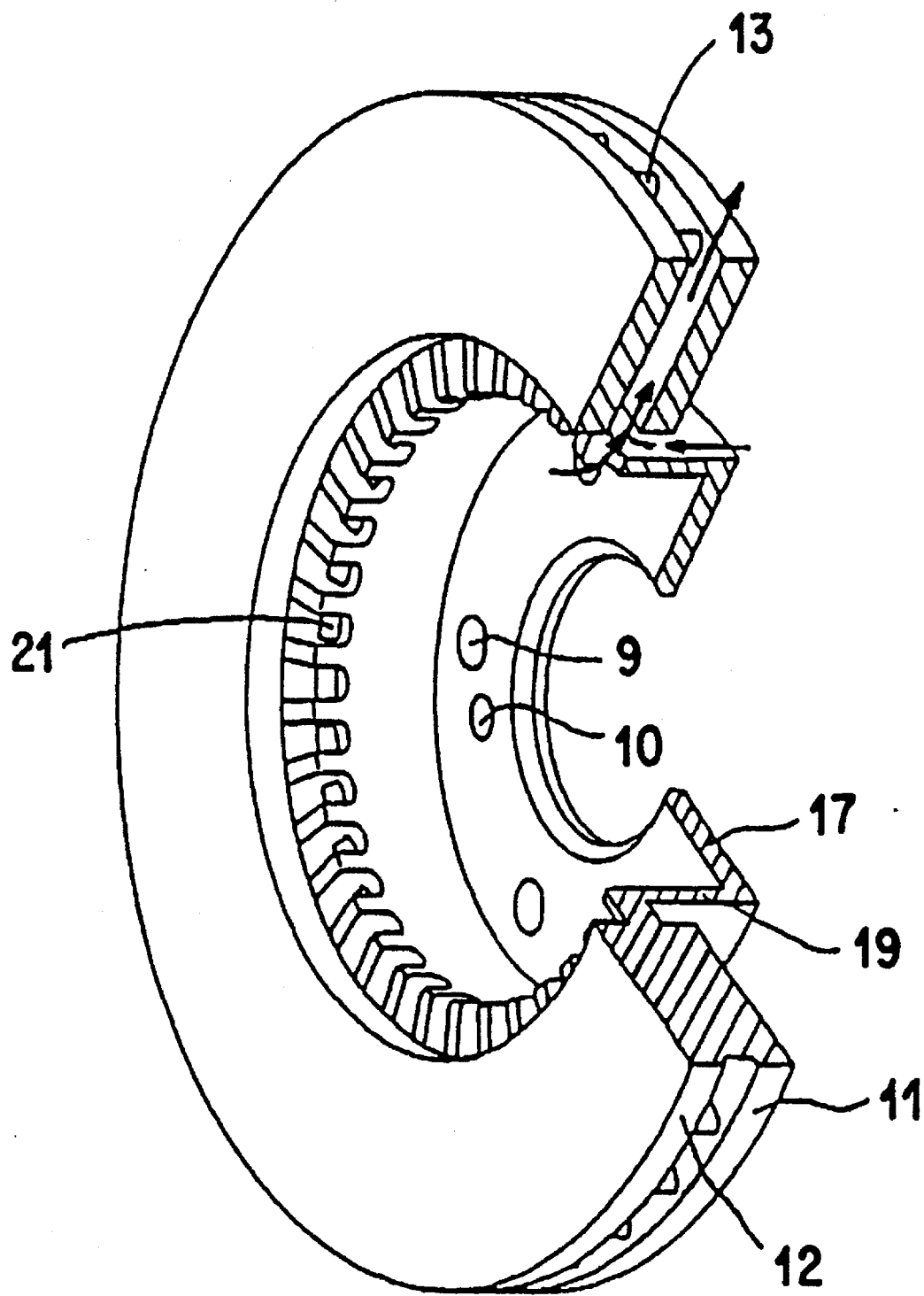
FIG. 21 is a perspective view of the embodiment illustrated in FIGS. 1 and 2.
Figure 22:
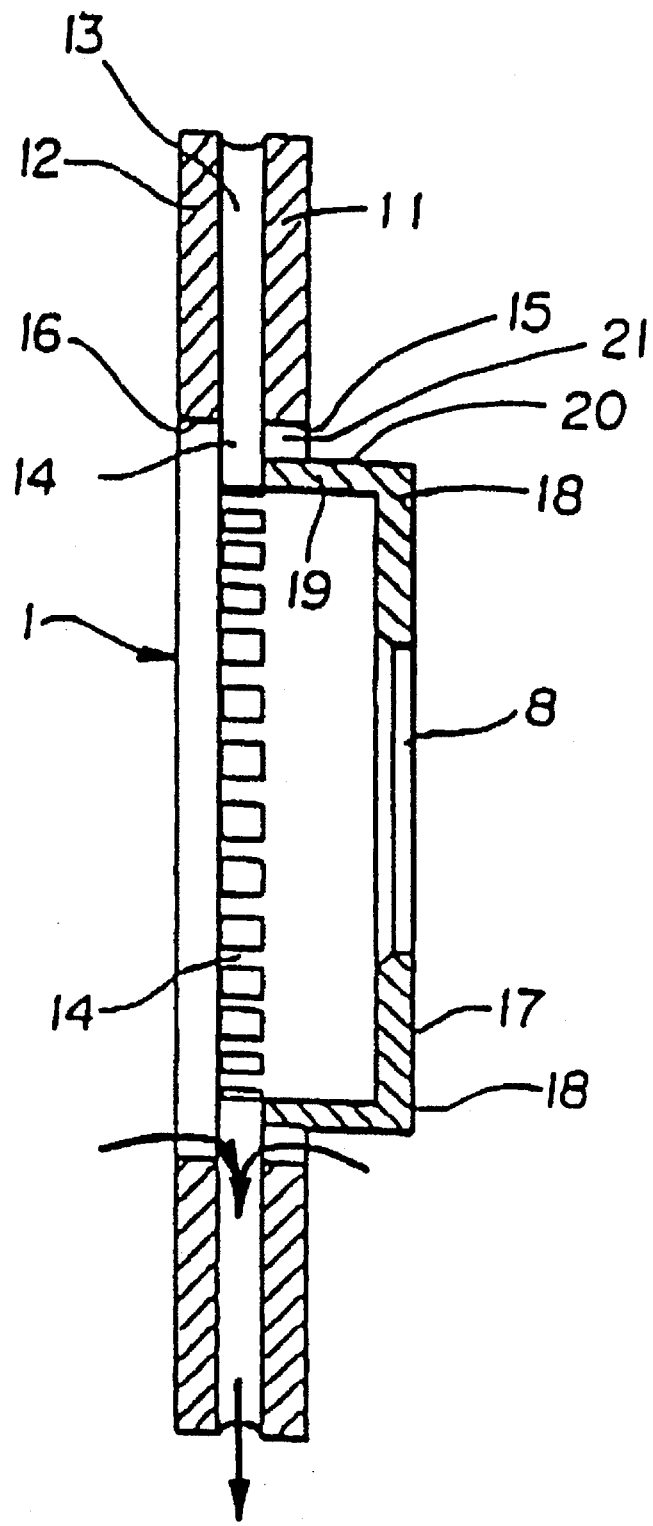
FIG. 22 is a longitudinal sectional view of the embodiment illustrated in FIGS. 1 and 2 cut along line 22—22 in FIG. 2 to show a longitudinal view between adjacent ribs.
Figure 23:
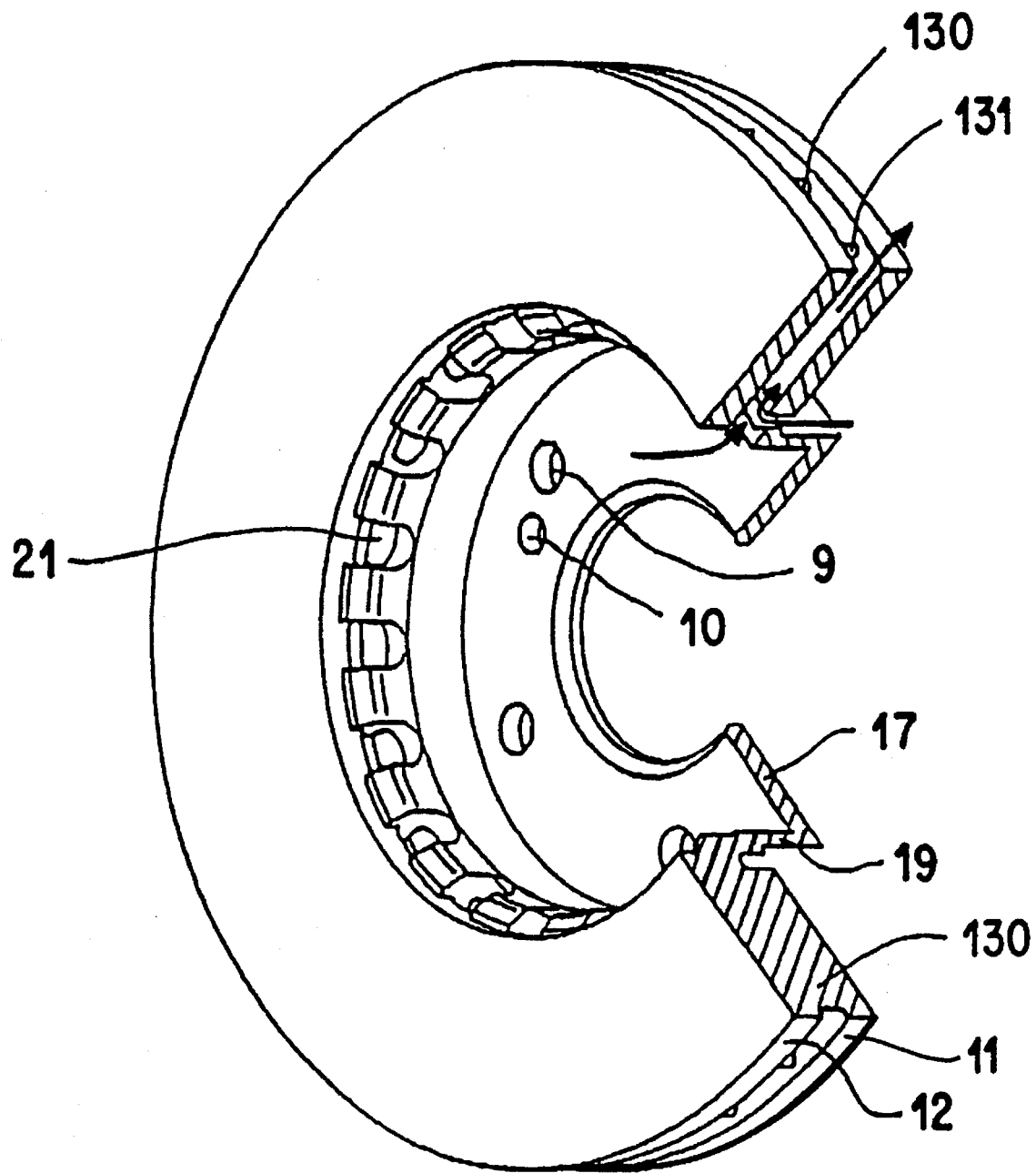
FIG. 23 is a perspective view of the embodiment illustrated in FIGS. 13–15.
Figure 24:
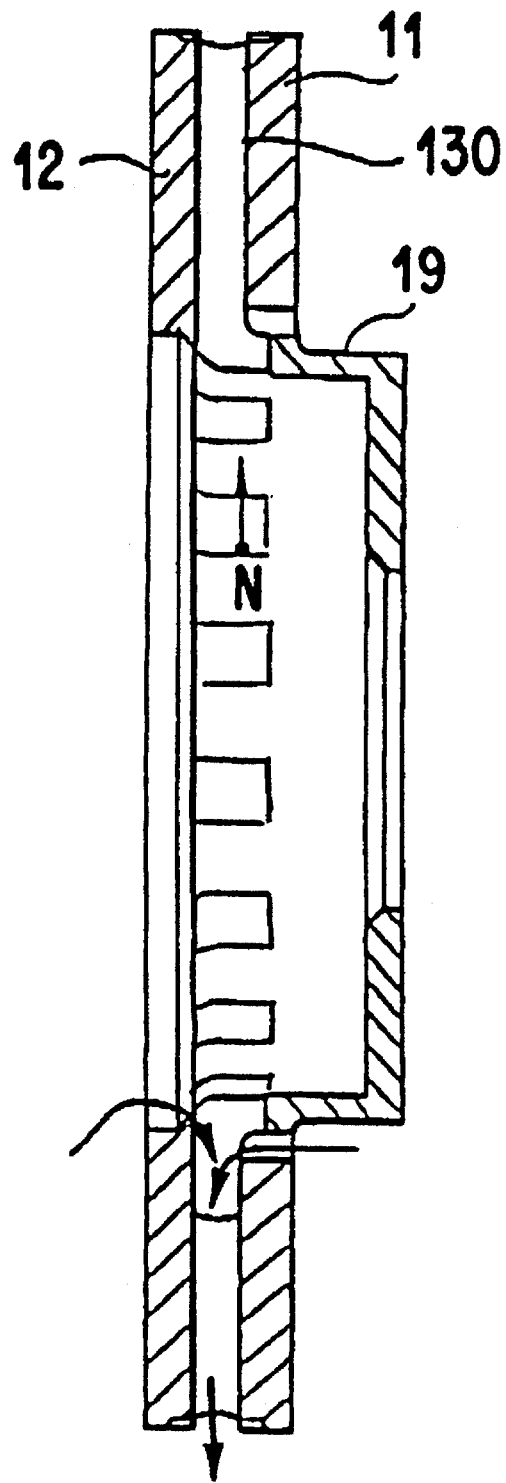
FIG. 24 is a longitudinal sectional view of the embodiment illustrated in FIGS. 13–15 cut along line 24—24 in FIG. 13 to show a longitudinal sectional view at the ribs and air flow through the disc.

FIG. 13 through 15 show still another embodiment of the invention, where a first rib 130 and a second rib 131 are alternately arranged. An inner end 141 of the second rib 131 is radially and outwardly recessed from the inner peripheral surfaces 15, 16 of the internal and external discs 11, 12. In other words, the inner end 141 of the second rib 131 does not extend to the inner peripheral surfaces 15, 16. On the other hand, an inner end 140 of the first rib 130 extends radially and inwardly from the inner peripheral surfaces 15, 16 of the internal and external discs 11, 12. The first rib 130 also has a broadened section 260 at and near the inner end 140. In the illustrated embodiment, the width of the broadened section 260 is greater than twice the width of the corresponding rib 130. However, the width of the broadened section 260 is not limited to the illustrated embodiment.

In the embodiment of FIGS. 13 through 15, a cooling air pathway 230 extends to the cylindrical member 19 and has an axial length greater than the axial thickness of the ribs 130, 131 by M. When the external disc 11 is put under stress as indicated by an arrow in FIG. 14, the stress can be effectively dispersed in an internal end 231 of the cylindrical member 19 and an internal peripheral surface 232 of the external disc 11 to further enhance the strength of the disc.

Figure 25:
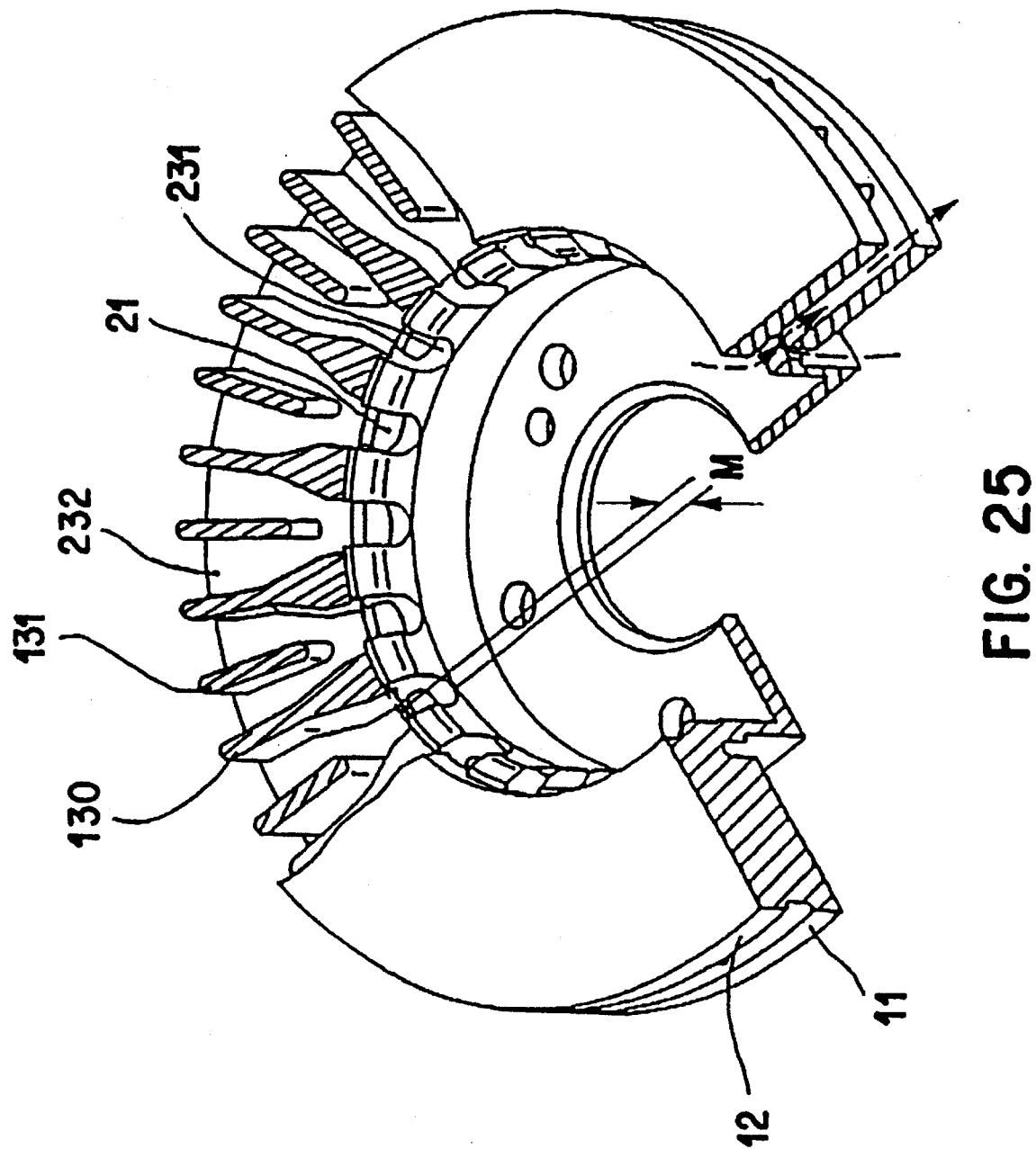
FIG. 25 is a perspective view of the FIGS. 13–15 embodiment better showing the air pathways according to the invention.

As described above, the cooling efficiency of a ventilated-type disc rotor according to the invention is remarkably enhanced by the fact that the external and internal discs of the rotor are connected only by way of ribs to a cylindrical member which is by turn connected to a fitting plate to be fitted to the main body of a vehicle and a cooling air pathway is provided between the inner peripheral surface of the external disc and the outer peripheral surface of the cylindrical member or, in other words, that the external disc that can be heated to considerably high temperature is not directly connected to the cylindrical member that remains cool to minimized the thermal deformation of the discs, prevent formation of cracks in the disc and consequently prolong the service life of the ventilated-type disc rotor. See FIG. 25 for a better understanding of the air pathways and cylindrical member structure.

Because of the minimized thermal deformation, the contact between the brake pad and the disc rotor is stabilized to enhance the performance of the brake and prevent generation of the phenomenon of brake jadder.

In another aspect of the invention, since the external and internal discs of a ventilated-type disc rotor according to the invention are connected to a cylindrical member only by way of ribs, which are axially made rather large and selectively provided with respective bulged reinforcement sections, the areas connecting the cylindrical member and the ribs are less liable to be thermal deformed and the areas connecting the discs, the ribs and the cylindrical members are less subjected to internal stress so that the contact between the brake pad and the disc rotor is stabilized to prevent generation of the phenomenon of brake jadder and consequently prolong the service life of the ventilated-type disc rotor.

In still another aspect of the invention, the above components of the disc rotor can be formed to a single piece by casting to reduce the number of steps and, at the same time, improve the strength of the disc rotor without involving difficulties in terms of casting. FIGS. 21–24 better show the air flow path, as shown by the arrows, through the embodiments of FIGS. 1–2 and FIGS. 13–15.

What is claimed is:
1. A ventilated-type disc rotor comprising:
   an external disc having an internal surface and an external surface;
   an internal disc;
   a flange to be fitted to a body of a vehicle;
   a cylindrical member continuously connected to an outer periphery of said flange;
   pathways for cooling air formed at an internal end of the cylindrical member and extending radially outward between the internal surface of the external disc and the internal disc;
   radial ribs arranged between and formed as one piece with the internal surface of the external disc, the internal disc and the flange, an axial thickness of said radial ribs being defined along an axial direction of the disc rotor between the internal surface of the external disc and the internal disc, an inner end of each of said ribs radially extending from inner peripheral surfaces of said internal disc and said external disc toward a center of said internal disc and said external disc, said inner end of each of said ribs being continously connected to the internal end of said cylindrical member; and
   a gap is formed between the inner periphery surface of the external disc and an outer peripheral surface of the cylindrical member, wherein
   said external disc is located along the axial direction between said ribs and said cylindrical member, and
   said internal end of said cylindrical member terminates prior to extending axially to the internal surface of said internal disc, thus defining cooling air pathways at the internal end of said cylindrical member that have an axial length greater than the axial thickness of said ribs.

2. The ventilated-type disc rotor according to claim 1, wherein bulged reinforcement sections are formed at and near the inner ends of the ribs.

3. The ventilated-type disc rotor according to claim 2, wherein
   a first rib and a second rib are arranged alternately,
   an inner end of said first rib extends radially and inwardly from the inner peripheral surfaces of the external disc and the internal disc,
   said second rib is recessed radially and outwardly from the inner peripheral surfaces of the external disc and the internal disc, and
   said first rib is provided with a broadened section at and near the inner end.

4. The ventilated-type disc rotor according to claim 1, wherein a bulge is formed on the outer peripheral surface of said cylindrical member.

5. A ventilated-type disc rotor having a rotary axis comprising:
   an external disc having an internal surface and an external surface;
   an internal disc;
   a flange to be fitted to a body of a vehicle;
   a cylindrical member continuously connected to an outer periphery of said flange;
   pathways for cooling air formed at an internal end of the cylindrical member between the internal surface of the external disc and the internal disc;

radial ribs arranged between and formed as one piece with the internal surface of the external disc, the internal disc and the flange, an inner end of each of said ribs radially extending from inner peripheral surfaces of said internal disc and said external disc toward a center of said internal disc and said external disc, said inner end of each of said ribs being continuously connected to the internal end of said cylindrical member; and a gap formed between the inner peripheral surface of the external disc and an outer peripheral surface of the cylindrical member, wherein said external disc is located along the rotary axis of the disc rotor between said ribs and said cylindrical member, and said internal end of said cylindrical member terminates axially prior to said internal surface of the external disc, and a bulge is formed on said outer peripheral surface of said cylindrical member.

* * * * *